United States Patent [19]
Johnson

[11] Patent Number: 5,806,949
[45] Date of Patent: *Sep. 15, 1998

[54] HARDWARE MOUNTING RAIL

[75] Inventor: Greg P. Johnson, Boise, Id.

[73] Assignee: Micron Electronics, Inc., Nampa, Id.

[*] Notice: The term of this patent shall not extend beyond the expiration date of Pat. No. 5,683,159.

[21] Appl. No.: 918,338

[22] Filed: Aug. 26, 1997

Related U.S. Application Data

[63] Continuation of Ser. No. 778,906, Jan. 3, 1997, Pat. No. 5,683,159.

[51] Int. Cl.⁶ .................................................. A47B 88/00
[52] U.S. Cl. ..................................... 312/334.7; 312/223.2; 439/377; 361/685
[58] Field of Search ............................. 312/334.7, 223.2, 312/223.1, 350, 334.1, 334.8, 333, 330.1, 315.1, 334.46; 439/377; 361/741, 756, 802, 685, 725, 726, 727; 248/27.1, 298.1

[56] References Cited

U.S. PATENT DOCUMENTS

| 3,932,016 | 1/1976 | Ammenheuser | 439/377 |
| 4,998,828 | 3/1991 | Hobbs | 312/334.46 X |
| 5,262,923 | 11/1993 | Batta et al. | 312/334.7 X |
| 5,587,889 | 12/1996 | Sacherman | 361/727 X |
| 5,599,080 | 2/1997 | Ho | 312/334.7 |
| 5,683,159 | 11/1997 | Johnson | 312/334.7 |

*Primary Examiner*—Peter M. Cuomo
*Assistant Examiner*—Janet M. Wilkens
*Attorney, Agent, or Firm*—Knobbe, Martens, Olson & Bear, LLP

[57] ABSTRACT

A slide rail for mounting internal devices, such as floppy disks and hard disks inside a computer case. The slide rail includes a biased mounting post which mates with matching mounting holes on opposite sides of the internal device. As the internal device is slid inside the computer case, the biased mounting posts protrude into the mounting holes of the internal device to reversibly affix the internal device to the computer case.

16 Claims, 6 Drawing Sheets

HARDWARE MOUNTING RAIL

This Application is a continuation of U.S. patent application Ser. No. 08/778,906, filed on Jan. 3, 1997, now U.S. Pat. No. 5,693,159, issued on Nov. 4, 1997.

BACKGROUND OF THE INVENTION

1. Field of the Invention

The present invention is related to mounting brackets for personal computers. More specifically, the present invention is related to spring-loaded slide rails for mounting internal devices into personal computers.

2. Description of the Related Art

Personal computers have become an integral part of most businesses. Due to increasing sales of personal computers, many computer manufacturers have begun to look for ways to more efficiently mass produce their products. As is known, most personal computers are built in an assembly line format with different computer components being installed at various positions along the line. Because of the increasing competitiveness in the computer marketplace, manufacturing speed and efficiency can translate into the difference between corporate profits and losses.

As the complexity of building new personal computers has increased, many companies have sought ways of simplifying their manufacturing process. For example, the original personal computers were held together with dozens of machine screws while newer machines have screwless connectors. In fact, some computers have been designed so that they can be opened and closed without a screwdriver.

Other improvements in computer manufacturing include screwless slide rails for mounting internal components into computer cases. As is well known, slide rails mount to opposite sides of internal components so that the component can be inserted and retracted from the computer case with ease. Internal components are devices such as floppy disk drives, hard disk drives and CD ROMs. In the past, slide rails were attached to the internal device with screws and the entire unit was thereafter slid into the computer case. The difficulty with this process is that it takes a relatively long time to mount the slid rails onto the internal device and then slide the completed unit into the computer case.

Some companies have addressed this problem with limited success. For example, A-TCH® produces a line of plastic slide rails which do not use screws to mount to the internal device. In the A-TCH® device, metal mounting posts are permanently affixed to the interior portion of the slide rail. Each slide rail contains two mounting posts which protrude inward and are designed to mate inside corresponding mounting holes on the internal device. Thus, it is not necessary to first screw-mount the A-TCH® slide rail to the internal device. The mounting posts are positioned inside of the internal device's mounting holes and the entire unit is thereafter slid into the computer case. However, this design still suffers from some of the problems associated with previous slide rails.

Prior to inserting the completed unit into the computer case, the mounting posts of the A-TCH® slide rail must be mated to their corresponding mounting holes on the internal device. However, most internal devices have numerous sets of mounting holes. Therefore, it is sometimes necessary for a computer technician to choose a set of mounting holes to mate with the slide rails. The final position of the internal device within the computer case will depend on the chosen set of mounting holes.

For example, if the mounting posts on the A-TCH® rails are mated with a forward set of mounting holes on the internal device, the rails will necessarily be mounted more forward in relation to the internal device. Thus, when the internal device is slid into the computer case it may be positioned too far forward and not allow the computer case to close properly.

If the mounting rails are attached improperly to the internal device, the entire assembly must be removed from the computer case so that the technician can move the mounting posts to another set of mounting holes on the internal device. Because the A-TCH® slide rails are mated with a chosen set of mounting holes before being positioned in the computer case, they suffer from many of the same problems as previous systems.

It would be advantageous to have a set of slide rails that would not mate with the internal device prior to being inserted into the computer case. Accordingly, the internal devices could be adjusted relative to the computer case with ease.

SUMMARY OF THE INVENTION

The present invention is a personal computer slide rail with spring-loaded mounting posts. Because the mounting posts are spring-loaded they can be adjusted relative to internal computer components much more easily than prior slide rails. As explained below and in reference to the attached figures, the mounting posts on the slide rail of the present invention only engage the internal device after that device is inserted into the computer case. When the internal device is outside the case, the mounting rails are free to slide into any position along the side of the internal device. Therefore, prior to being inserted into the computer case, the technician is free to adjust the position of the mounting rails to properly mount the internal device on the first attempt.

When using the slide rails of the present invention, they are first positioned against opposite sides of the internal device. The slide rails are positioned such that the spring-loaded mounting posts will mate with what the technician believes are the appropriate mounting holes. The appropriate mounting holes are those that the slide rail must mate with to properly position the internal device into the computer case.

However, since most internal devices have a series of mounting holes, the technician can never be sure that the proper mounting holes were chosen until the device is actually mounted inside the case. As the internal device and slide rails of the present invention are slid into the computer case, internal channels in the computer case force the spring-loaded posts to engage with the mounting holes of the internal device. Thus, the channels inside the computer case that accept the slide rails will force the mounting posts to mate with their corresponding mounting holes as the device is inserted.

If the technician discovers that the internal device will not be positioned appropriately as it is being slid into the computer case, the assembly can be quickly withdrawn and the slide rails moved so they are positioned above another set of mounting holes. Unlike prior systems, the mounting posts on the slide rails in the present invention do not engage the internal device until the internal device has been partially inserted into the computer case. Therefore, it is easier for the technician to remount the slide rails onto the internal device if they were positioned incorrectly on the first try.

One further advantage provided by the slide rails of the present invention is that they place spring-loaded tension between the internal device and the computer case. As explained above, the mounting posts are spring-loaded so that they place pressure between the internal device and the computer case. The spring-loaded tension between the internal device and the computer case is advantageous because it causes the internal device to be held in position with more force than the prior art. This leads to a more durable and sturdy computer system which can better survive bumps and drops without damage. Thus, the spring-loaded slide rails of the present invention provide several advantages over prior systems.

DETAILED DESCRIPTION OF THE PREFERRED EMBODIMENT

The following description of the preferred embodiment references FIGS. 1–7 wherein like numerals refer to like elements throughout the specification.

The present invention is a slide rail for reversibly mounting internal devices into computer cases. As has been discussed above, slide rails are attached to opposite sides of internal devices, such as floppy drives, so that the internal devices can be securely, yet removably, mounted into computer cases. The slide rail of the present invention includes at least one spring-loaded mounting post so that it can be quickly and efficiently mounted to an internal device. In addition, the spring-loaded slide rail of the present invention provides for a more secure means of mounting internal devices to computer cases.

As will be discussed in more detail below, mounting posts on the slide rail of the present invention are spring-loaded so as to be biased away from the inner surface of the slide rail. The inner surface of the slide rail is the surface that contacts the internal device. Thus, the inner surface of the slide rail of the present invention comprises a smooth surface since the mounting posts do not protrude through the inner surface in their normal biased position.

The inner surface's smooth surface allows the slide rail of the present invention to be positioned easily over the sides of the internal device. In addition, as explained in more detail below, the outwardly biased flanges on the slide rail advantageously add tension to the internal device so that it mounts more securely inside the computer case. Once the internal device and slide rail are mounted into the computer case, the biased flanges press outward and add tension between the computer case and internal device.

Figure 1:
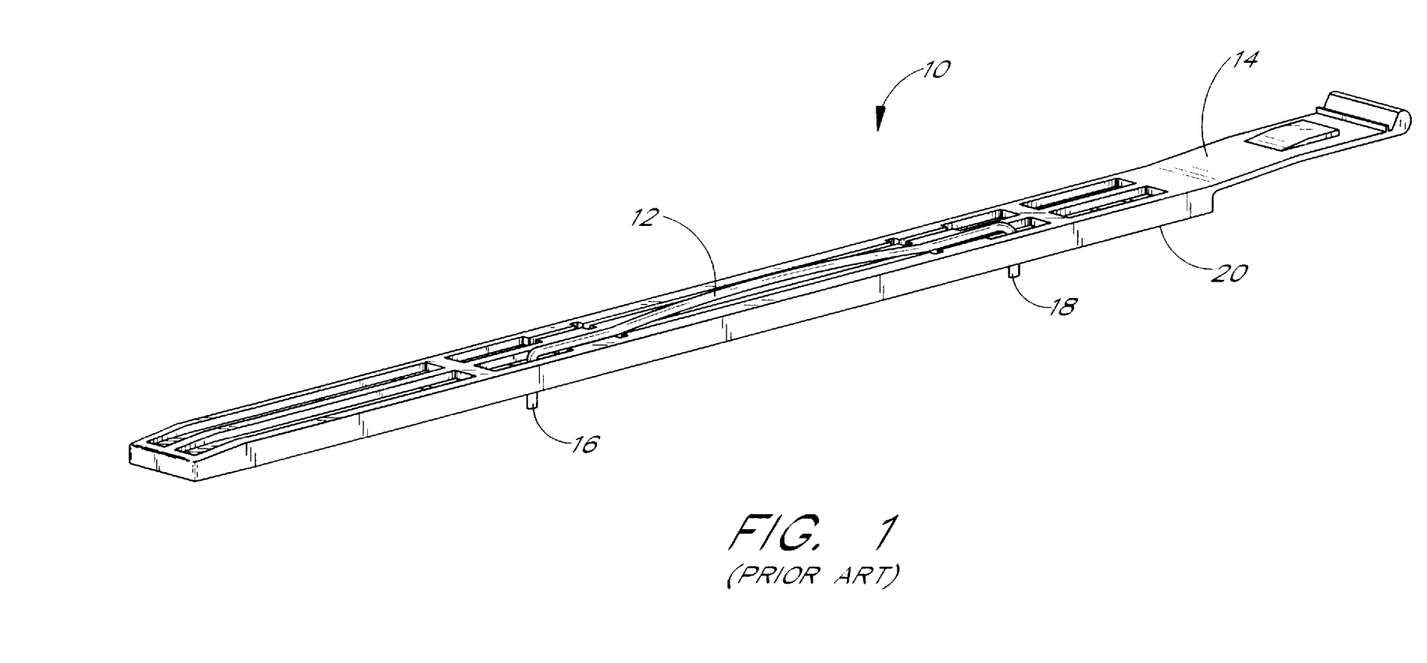
FIG. 1 is a perspective view of a prior art slide rail having permanent metal posts which protrude through the slide rail's attachment side.

Referring to FIG. 1, a prior art slide rail 10 is shown. As can be seen, a heavy gauge metal wire 12 is positioned laterally across the outer side 14 of the slide rail 10. The wire 12 includes ends 16 and 18 which protrude through the slide rail 10 and exit the inner surface 20 of the slide rail 10. The protruding ends 16 and 18 of the metal wire 12 are designed to mate with similarly spaced mounting holes on an internal device such as a floppy disk. It should be noted that the metal wire 12 is affixed to the slide rail 10 so that the protruding ends 16 and 18 do not retract from their position. Thus, the inner surface 20 is not smooth across its length, but rather has metal protruding ends 16 and 18 effectively interrupting the inner surface 20.

Figure 2:
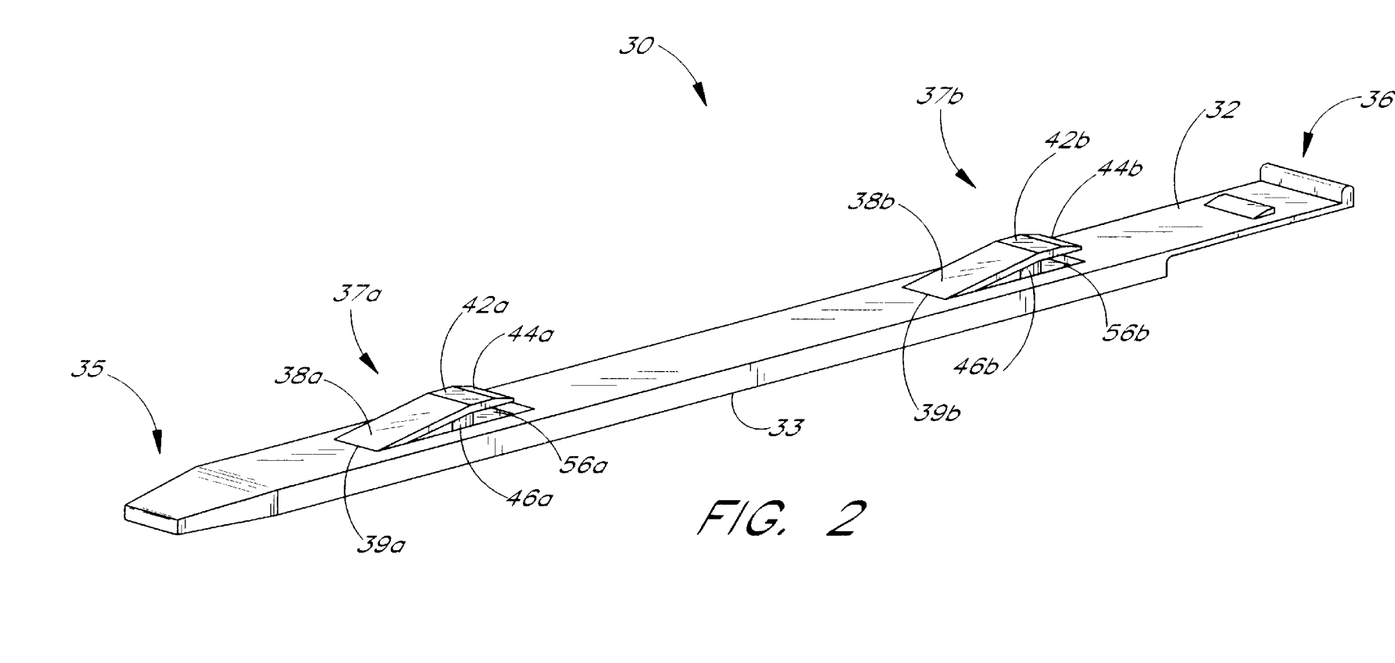
FIG. 2 is a perspective view of one preferred embodiment of the slide rail of the present invention.

Referring to FIG. 2, a perspective view of the present invention slide rail 30 is shown. The slide rail 30 is an elongated rectangle with an outer surface 32, inner surface 33, nose 35 and tail 36. Protruding from the outer surface 32 are a pair of outwardly biased flanges 37a,b.

Each biased flange 37 includes a sloped forward surface 38a,b that connects to the outer surface 32 at a leading edge 39a,b. The sloped forward surface 38a,b extends rearwardly from the leading edge 39a,b to include a center plane 42a,b and a rearward edge 44a,b. A cylindrical mounting post 46a,b is affixed to the inner surface of the center plane 42a,b so as to extend therefrom through an opening 56a,b in the slide rail 30 and extend outwardly from the inner surface 33 when the flange 37a,b is forced toward the inner surface 33. The mounting post 46a,b is configured to mate with corresponding mounting holes on a personal computer internal device.

The sloped forward surface 38a,b attaches to the outer surface 32 of the slide rail 30 in a manner that biases the sloped forward surface 38a,b away from the outer surface 32. As shown, the sloped forward surface 38a,b sits at a chosen angle above the outer surface 32. Thus, the entire biased flange 37a,b normally rests in this angled position. If inward pressure is placed upon the sloped forward surface 38a,b, the biased flange 37a,b will move downward toward the outer surface, 32.

As discussed above, the mounting post 46a,b is affixed to the central plane 42a,b of the biased flange 37a,b. The center plane 42a,b is preferably oriented so that it remains mostly parallel with the outer surface 32, even when the biased flange 37a,b is in its closed or open state. The biased flange 37a,b is open when there is no anti-biasing pressure upon the biased flange, but closed when it is forced downward into a closed position.

The center plane 42 of the biased flange 37a,b is smooth on its outer side so that when the biased flange 37a,b is in the closed position, the outer side of the center plane 42a,b is smooth across its surface and mates to form a substantially continuous surface with the outer surface 32 of the slide rail 30. Accordingly, as the sloped forward surface 38a,b is pressed into the closed position, the mounting post 46a,b moves perpendicularly in relation to the outer surface 32 and protrudes out from the inner surface 33 of the slide rail 30.

It can be imagined that if anti-biasing pressure is placed on the center surface 42a,b, the entire biased flange 37a,b will move toward the opening 56a,b in the slide rail 30. As discussed above, the biased flange 37a,b can be depressed into the opening 56a,b in the outer surface 32. The opening 56a,b is adapted to conform with the rectangular shape of the biased flange 37a,b.

Figure 3:
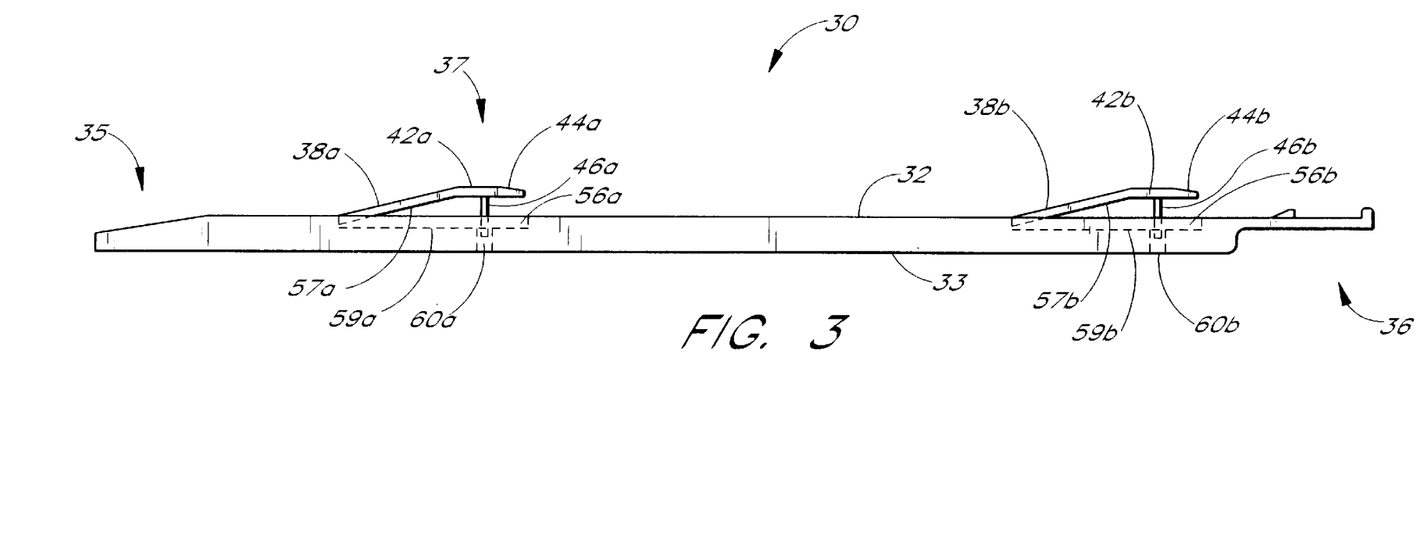
FIG. 3 is a side elevational view of the slide rail of the present invention showing the spring-loaded mounting posts.

Referring to FIG. 3, as the biased flange 37a,b moves toward the opening 56a,b, an underside 57a,b of the biased flange 37a,b contacts a base 59a,b of the opening 56a,b. The base 59a,b comprises a surface that is recessed below the outer surface 32 and is located within at least a portion of the opening 56a,b. Accordingly, when the biased flange 37a,b is forced completely inside the opening 56a,b, the underside 57a,b will fully contact the base 59a,b. It can also be seen that the depth of the opening 56a,b within the body of the slide rail 30 is chosen so that when the biased flange 37a,b seats into the opening 56a,b, the sloped forward surface 38a,b and center plane 42a,b become mostly uniform with the outer surface 32 of the slide rail 30.

It is not necessary for the biased flange 37a,b to be completely uniform with the outer surface 32 after it is pressed into the opening 56a,b. However, it is advantageous to have the biased flange 37a,b seat inside the opening 56a,b so that the flange remains mostly uniform with the outer surface 32 of the slide rail 30. If the biased flange 37a,b remains mostly uniform with the outer surface 32 when it is closed, the internal device can be slid into the computer case with greater ease, as will be discussed below in reference to FIGS. 5 and 6.

As the biased flange 37a,b is pressed into the opening 56a,b, the mounting post 46a,b traverses a through-hole 60a,b in the slide rail 30. The through-hole 60a,b runs substantially perpendicular to the inner surface 33 and outer surface 32 and provides a passageway from the opening 56a,b to the inner surface 33. By traversing the through-hole 60a,b, the mounting post 46a,b can move from the opening 56a,b to extend beyond the inner surface 33. As shown in FIG. 3, the length of the mounting post 46a,b is chosen so that it protrudes outwardly from the inner surface 33 when the biased flange 37a,b is in the closed position, but does not protrude therefrom when the flange 37a,b is in the open position. By protruding from the inner surface 33, the mounting post can thereby engage an internal device (not shown).

Figure 4:
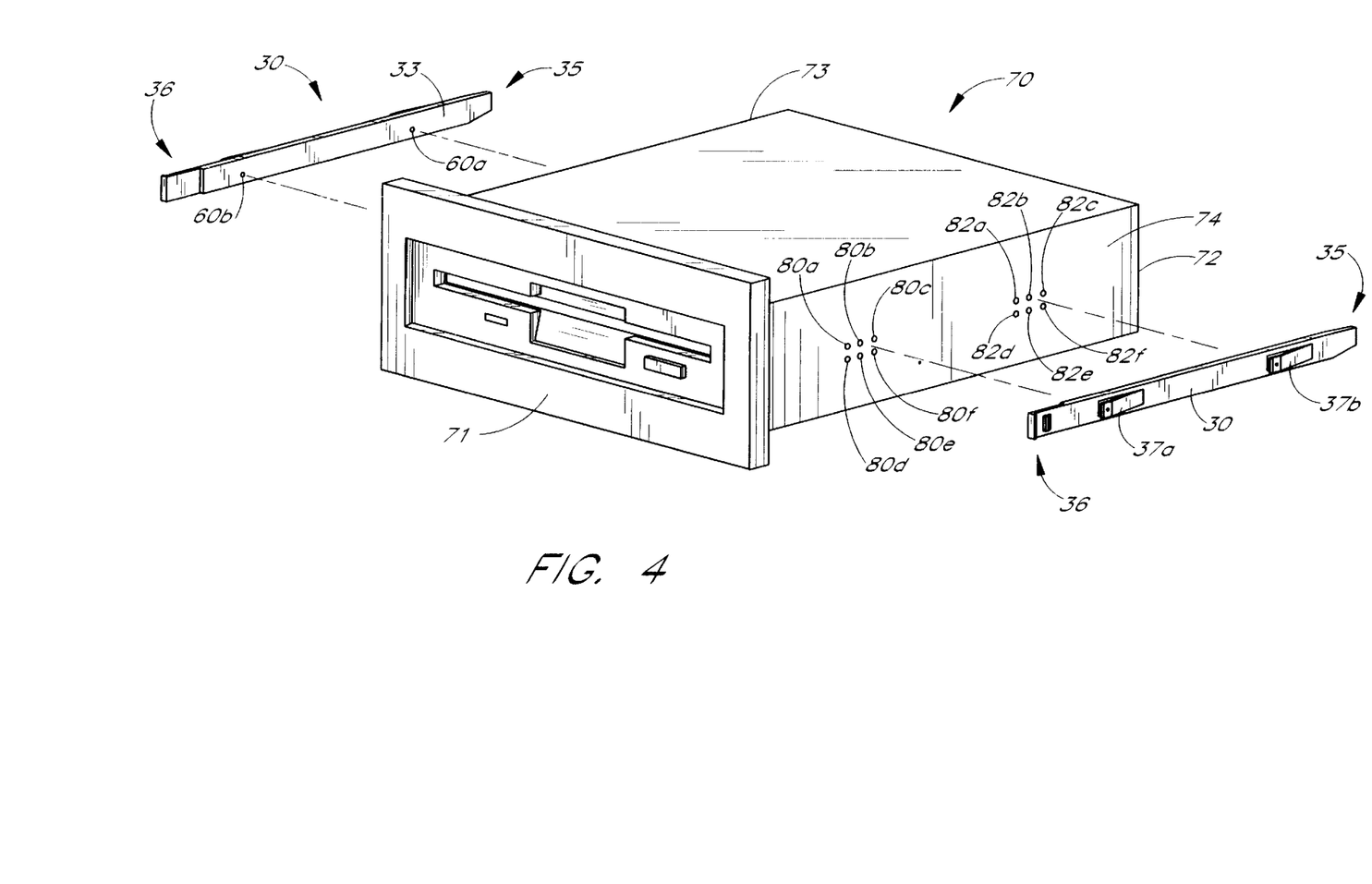
FIG. 4 is an assembly drawing of the slide rails of the present invention mounting to opposing sides of a floppy disk drive.

Referring to FIG. 4, a set of the slide rails are shown being mounted to an internal floppy drive 70. The floppy drive 70 has a front 71, back 72, left side 73 and right side 74. As is standard in the art, the slide rails mount so that the nose 35 points towards the back 72 of the floppy drive 70. In addition, the sides 73, 74 of the floppy drive 70 include a forward set of mounting holes 80a–f and rearward set of mounting holes 82a–f. The sets of mounting holes 80a–f and 82a–f are designed to mate with the mounting posts 46 of the slide rail 30. Thus, the distance between the mounting holes 80 and 82 is similar to the spacing between the mounting posts 46a and 46b of the slide rail 30.

The slide rail 30 is aligned with the mounting holes 80a–f and 82a–f such that the mounting posts 46a,b (FIG. 3) engage with their corresponding mounting holes on the side of the floppy drive 70. It can be imagined that the slide rail 30 can be mounted in various orientations in relation to the side 74 of the floppy drive 70 by selecting different mounting holes from the forward set of mounting holes 80a–f and rearward set of mounting holes 82a–f. For example, the mounting posts 46a,b of the slide rail 30 can be positioned so that they will be inserted into the front mounting hole 80c and rearward mounting hole 82c. By selecting various sets of mounting holes to mate with the mounting posts, the position of the slide rail 30 in relation to the floppy drive 70 can be altered. In practice, a technician will hold the slide rails in their appropriate position on either side of the internal device so that the mounting posts correctly insert into the desired mounting holes. Accordingly, the final position of the floppy drive 70 within a computer case 100 (FIG. 5) can also be determined.

Figure 5:
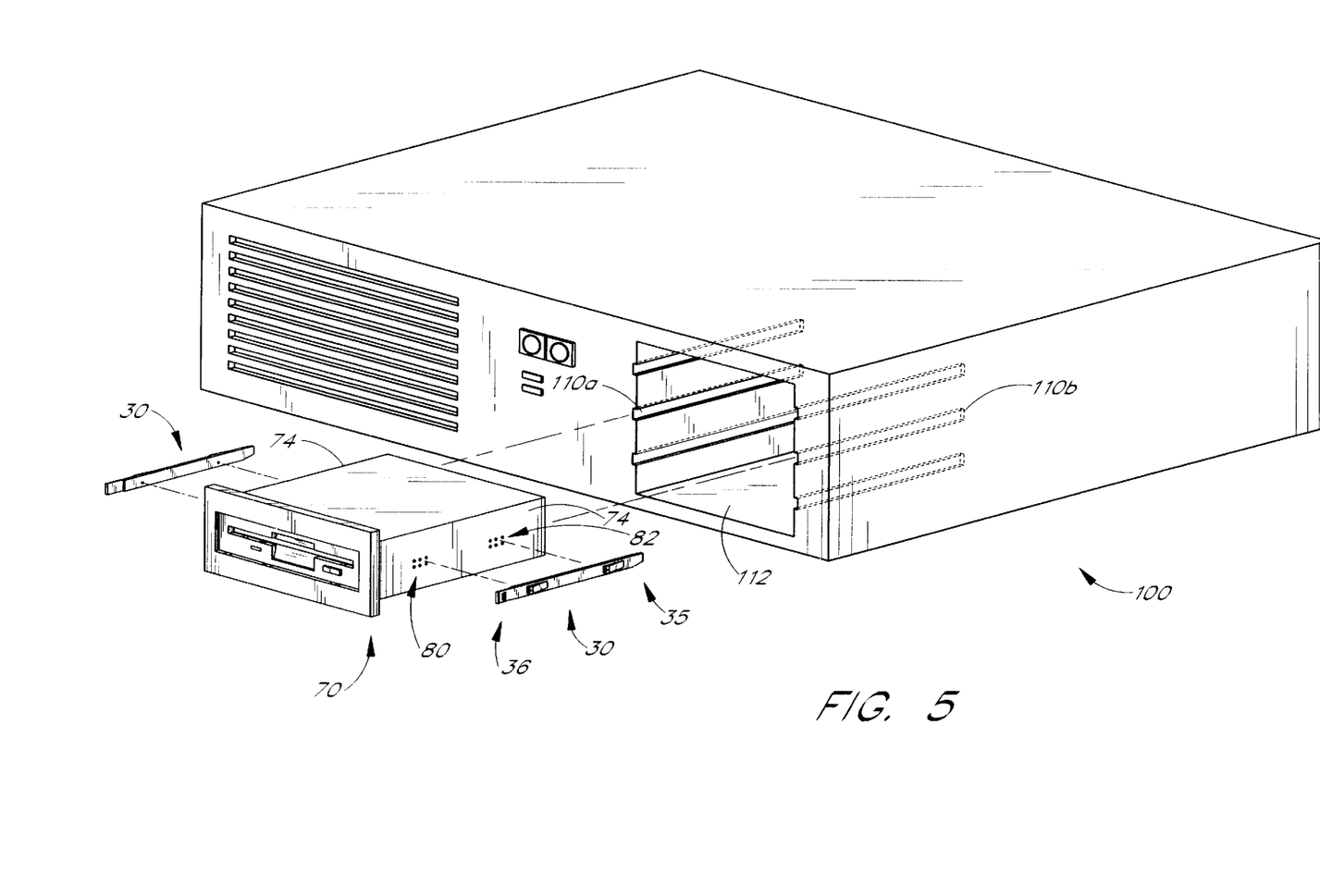
FIG. 5 is an assembly drawing of the slide rails of the present invention mounting to a floppy disk drive which is inserted into a computer case.

As illustrated in FIG. 5, once the slide rails 30 are positioned against the side of the floppy drive 70, the entire assembly is inserted into a set of mounting channels 110a,b in the computer case 100. The floppy drive 70 thereby becomes affixed to the computer case 100 by being slid inside the computer case 100 and retained via the slide rails. It is understood that the width of the slide rail 30 is slightly less than the width of the slide channel 110 so that the slide rail 30 can move within the slide channel 110 is without sticking or binding. It can also be appreciated that the width of the floppy drive 70 is slightly less than the width of an opening 112 in the computer case 100 so that the floppy drive 70 fits snugly within the opening 112 of the computer case 100.

Figure 6:
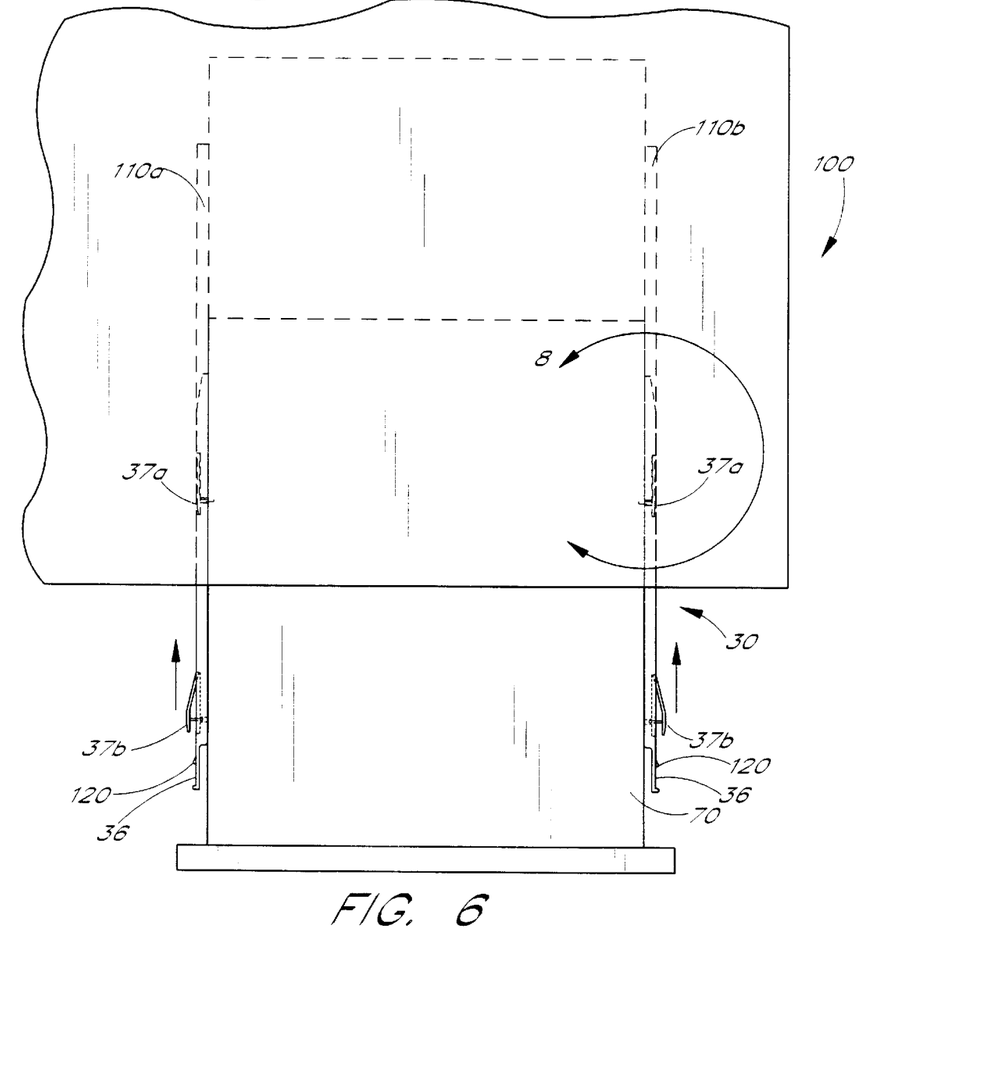
FIG. 6 is a top plan view of the slide rails of the present invention as they appear when attached to a floppy disk drive that is inserted into a computer case.

When the floppy drive 70 and its associated slide rails are inserted into the opening 112, the slide rails become engaged into their corresponding channels 110. As shown in FIG. 6, each slide rail 30 becomes engaged within its corresponding slide channel as the floppy drive 70 is inserted into the computer case 100. This occurs because the biased flange 37 becomes compressed towards to the opening 56 by compressive pressure from being inserted into the channels 110. Accordingly, each mounting post 46 is forced into its corresponding mounting hole in the floppy drive 70.

Figure 7:
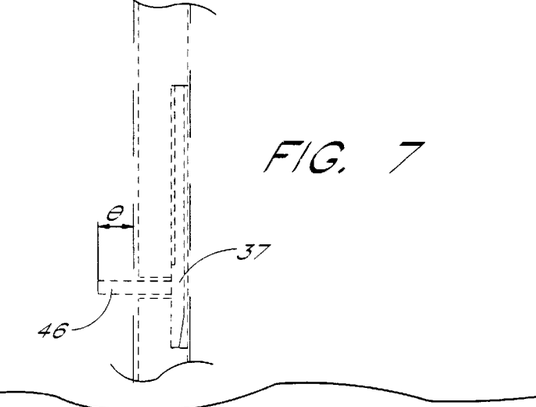
FIG. 7 is an enlarged top plan view of the spring-loaded mounting post of the slide rail of the present invention taken along Section 8 of FIG. 6.

FIG. 7 reveals an enlarged view of the compressed biased flange 37 as it is positioned within a slide rail 110. The mounting post 46a,b is shown as extending into the floppy drive 70 by a distance θ. The distance θ of the mounting post 46 is the portion of the mounting post 46a,b that protrudes into the floppy drive 70. Because the mounting posts 46a,b protrude into the mounting holes 80 and 82 of the floppy drive 70 when compressed into a closed position, the floppy drive 70 is held in position by the slide rails 30, within the computer case 100.

Once the floppy drive 70 is slid completely into the computer case 100, the tail 36 reversibly latches to the computer case 100 so that the floppy drive 70 cannot slide forward. Thus, the floppy drive 70 is reversibly retained within the computer case 100.

As shown in FIG. 6, the tail 36 includes a tab 120 on the outer surface 32. The tab 120 is formed to fit within a retaining hole (not shown) in the channel 110. As the floppy drive 70 and slide rail 30 are pressed inside the case 100, the tab 120 reversibly latches into a retaining hole in the channel 110. To remove the floppy drive 70 from the case 100, the tail 36 is bent towards the floppy drive 70 so that the tab 120 releases from the retaining hole in the channel 100. The floppy drive 70 can then be removed from within the case 100.

Using the Slide Rail of the Present Invention

As discussed above, the slide rail of the present invention is used to mount an internal device, such as a floppy drive, hard drive, CD-ROM or tape drive into a computer case. In practice, the slide rail 30 is held by a technician in an appropriate position in relation to the floppy drive so that, once inserted, the floppy drive will be positioned properly within the computer case. While the technician holds a pair of slide rails against the opposite sides of an internal device, the entire unit is slid inside of a computer case.

To slide the unit into the computer case, the nose 35 of each slide rail 30 is placed at the opening of each slide channel 110. The unit is then slid toward the case 100 as the slide rails 30 move inside of the slide channels 110. As the sloped forward surface 38a,b (FIG. 2) of the biased flange 37a,b contacts the slide channel, it is forced from an open to a closed position. As the slide rail 30 is moved further inside the computer case 100, the biased flange 37a,b begins moving into a closed position.

Since the mounting post 46a,b is attached to the biased flange 37a,b, as the biased flange moves into a closed position, the mounting post 46a,b starts traversing the through-hole 60 (FIG. 3) and begins to engage a mounting hole on the side of the internal device. As the internal device and slide rail are pressed further into the computer case, the biased flange closes more completely, thereby causing the mounting post to enter a mounting hole in the internal device by the distance θ (FIG. 7).

One valuable advantage of the slide rail of the present invention is that its spring-loaded mounting post gives the technician more flexibility in mounting the slide rail to the internal device.

Although a preferred embodiment of the hardware mounting rail of the present invention has been discussed in the preceding section, the invention is not limited to this embodiment. Other embodiments which capture the spirit of the invention are also anticipated. The scope of the invention is not limited to the embodiment discussed above, but is only limited by the following claims.

What is claimed is:

1. A slide rail for engagement between a case and an internal device, comprising:

an elongated body having an inner surface, an outer surface and an opening therethrough; and at least one biased flange defining an engagement means and attached to said body, said biased flange protruding outwardly from said outer surface when in a non-engaged position with the case and the device and being in communication with a mounting post so that said mounting post traverses said opening and protrudes from said inner surface when said biased flange is in an engaged position.

2. The slide rail of claim 1 wherein said elongated body is rectangular.

3. The slide rail of claim 1, further comprising an opening in the outer surface of said slide rail so that said biased flange rests inside said opening when said biased flange is in the engaged position.

4. The slide rail of claim 1 wherein said mounting post is affixed to said-biased flange.

5. The slide rail of claim 1 wherein said slide rail additionally comprises a tail having a tab for mounting with the case.

6. The slide rail of claim 1 wherein said mounting post and said biased flange are plastic.

7. A slide rail for mounting internal devices into a case, comprising:

an elongated body having an inner surface, an outer surface, a head and a tail;

at least one biased flange defining an engagement means and attached to the outer surface of said body, wherein said biased flange protrudes outwardly from said outer surface when in a non-engaged position with the case and the devices and is in communication with a mounting post; and a through-hole defining a passageway from said inner surface to said outer surface and positioned to allow said mounting post to travel from said outer surface to said inner surface when said biased flange is in an engaged position.

8. The slide rail of claim 7 wherein said elongated body is rectangular.

9. The slide rail of claim 7 wherein said mounting post is affixed to said biased flange.

10. The slide rail of claim 7 wherein said tail additionally comprises a tab for mounting with the case.

11. The slide rail of claim 7 wherein said mounting post and said biased flange are plastic.

12. In combination:

a computer case having a slide channel;

a slide rail having an inner surface and an outer surface, said slide rail being engaged with said slide channel;

at least one biased flange attached to said slide rail, said biased flange protruding outwardly from said outer surface when in an open position and being in communication with a mounting post so that said mounting post protrudes inward from said inner surface when said biased flange is in a closed position; and an internal device disposed along the inner surface of said slide rail and having at least one mounting hole in communication with said mounting post so that said internal device is removably attached to said computer case.

13. The combination of claim 12 wherein said slide rail comprises an elongated body.

14. The combination of claim 12, further comprising an opening in the outer surface of said slide rail so that said biased flange rests inside said opening when said biased flange is in the closed position.

15. The combination of claim 12, wherein said computer case further comprises an additional slide channel.

16. The combination of claim 12, wherein said internal device is selected from the group consisting of: a tape drive, a hard disk, a floppy disk and a CD-ROM drive.

* * * * *